US011927394B2

(12) United States Patent
Yamaguchi et al.

(10) Patent No.: US 11,927,394 B2
(45) Date of Patent: Mar. 12, 2024

(54) HEAT TREATMENT APPARATUS AND HEAT TREATMENT METHOD

(71) Applicant: Tokyo Electron Limited, Tokyo (JP)

(72) Inventors: Tatsuya Yamaguchi, Iwate (JP); Toshiyuki Ito, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 114 days.

(21) Appl. No.: 17/655,240

(22) Filed: Mar. 17, 2022

(65) Prior Publication Data

US 2022/0307770 A1 Sep. 29, 2022

(30) Foreign Application Priority Data

Mar. 29, 2021 (JP) ................................ 2021-055198

(51) Int. Cl.

| | |
|---|---|
| ***F27D 5/00*** | (2006.01) |
| ***F27B 17/00*** | (2006.01) |
| ***F27D 11/00*** | (2006.01) |
| *F27D 7/02* | (2006.01) |
| *F27D 7/04* | (2006.01) |
| *F27D 9/00* | (2006.01) |

(52) U.S. Cl.

CPC .......... *F27B 17/0025* (2013.01); *F27D 11/00* (2013.01); *F27D 2007/026* (2013.01); *F27D 2007/045* (2013.01); *F27D 2009/0075* (2013.01)

(58) Field of Classification Search

CPC .... F27B 1/24; F27B 3/24; F27B 15/16; F27D 2019/0056; F27D 1/12; F27D 5/0037; F27D 2001/0073; F27D 9/00; F23M 5/08; H01L 21/67; H01L 21/67098; H01L 21/67109

See application file for complete search history.

(56) References Cited

U.S. PATENT DOCUMENTS

2011/0223693 A1* 9/2011 Sugishita ............ F27B 17/0025 219/385
2014/0193762 A1* 7/2014 Grenier ..................... F27B 3/20 432/128
2022/0298627 A1* 9/2022 Nishino ............ C23C 16/45519

FOREIGN PATENT DOCUMENTS

| | | | | | |
|---|---|---|---|---|---|
| CN | 111223795 | A | * | 6/2020 | ......... H01L 21/2636 |
| CN | 115116896 | A | * | 9/2022 | ....... H01L 21/67109 |
| JP | 4365017 | B2 | * | 11/2009 | ....... H01L 21/67109 |
| JP | 2020-088207 | | | 6/2020 | |
| KR | 20130029009 | A | * | 3/2013 | |

* cited by examiner

*Primary Examiner* — Gregory A Wilson
(74) *Attorney, Agent, or Firm* — IPUSA, PLLC

(57) ABSTRACT

A heat treatment apparatus according to one aspect of the present disclosure includes a vertically long process chamber, a heater configured to heat the process chamber, and a cooler configured to cool the process chamber. The cooler includes a plurality of discharge holes provided at intervals along a longitudinal direction of the process chamber to discharge cooling fluid toward the process chamber and a plurality of shutters provided corresponding to the plurality of discharge holes. At least one of the plurality of shutters is configured to move to an open position independently of other shutters.

12 Claims, 11 Drawing Sheets

HEAT TREATMENT APPARATUS AND HEAT TREATMENT METHOD

CROSS-REFERENCE TO RELATED APPLICATIONS

This patent application is based upon and claims priority to Japanese Patent Application No. 2021-055198 filed on Mar. 29, 2021, the entire contents of which are incorporated herein by reference.

TECHNICAL FIELD

The present disclosure relates to a heat treatment apparatus and a heat treatment method.

BACKGROUND

A heat treatment apparatus is known that is provided along the longitudinal direction of a process chamber and has a shutter mechanism that simultaneously opens/closes multiple discharge portions blowing out cooling fluid toward the process chamber (see, for example, Patent Document 1).

RELATED ART DOCUMENTS

Patent Documents

[Patent Document 1] Japanese Unexamined Patent Application Publication No. 2020-088207

SUMMARY

The present disclosure provides a technique for improving temperature control at low temperatures.

A heat treatment apparatus according to one aspect of the present disclosure includes a vertically long process chamber, a heater configured to heat the process chamber, and a cooler configured to cool the process chamber. The cooler includes a plurality of discharge holes provided at intervals along a longitudinal direction of the process chamber to discharge cooling fluid toward the process chamber and a plurality of shutters provided corresponding to the plurality of discharge holes. At least one of the plurality of shutters is configured to move to an open position independently of other shutters.

DETAILED DESCRIPTION OF EMBODIMENTS

Figure 1:
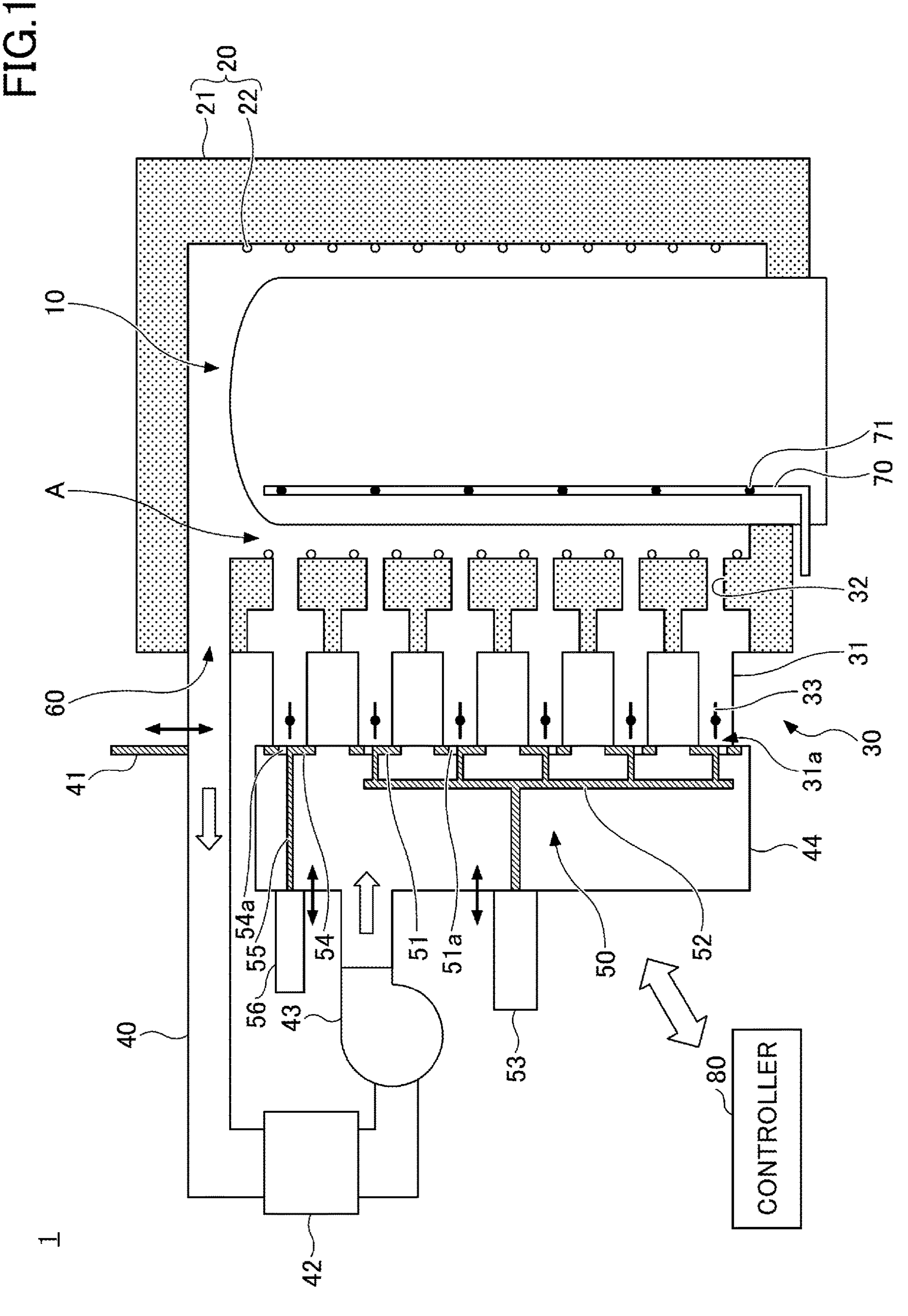
FIG. 1 is a schematic diagram (1) illustrating an example of a configuration of a heat treatment apparatus according to a first embodiment.

Hereinafter, non-limiting exemplary embodiments of the present disclosure will be described with reference to the accompanying drawings. In all the accompanying drawings, the same or corresponding reference numerals shall be attached to the same or corresponding components and overlapping descriptions may be omitted.

First Embodiment (Heat Treatment Apparatus)

A configuration example of a heat treatment apparatus of a first embodiment will be described with reference to FIG. 1 to FIG. 6.

A heat treatment apparatus 1 according to the first embodiment includes a process chamber 10, a heating unit 20, a discharge unit 30, a fluid flowing path 40, a shutter mechanism 50, a heat exhaust unit 60, a temperature detector 70, a controller 80, and the like. The discharge unit 30, the fluid flowing path 40, the shutter mechanism 50, and the heat exhaust unit 60 constitute a cooler for cooling the process chamber 10.

The process chamber 10 may be, for example, a vertically long chamber accommodating a boat. The boat holds multiple substrates while having an interval along a height direction. The substrate is, for example, a semiconductor wafer. The process chamber 10 may have a single tube structure or a double tube structure. The process chamber 10 is formed of a heat-resistant material such as quartz. The inside of the process chamber 10 is depressurized by an exhaust means. The exhaust means include a pressure regulating valve, a vacuum pump, and the like. Various gases are introduced into the process chamber 10 by a gas supply. The gas supply includes a gas introduction pipe, an opening/closing valve, a flow rate controller, or the like. The various gases include, for example, a film forming gas, a processing gas such as an etching gas, a purge gases such as inert gases, and the like.

The heating unit 20 is provided around the process chamber 10 to heat the substrate in the process chamber 10. The heating unit 20 includes a heat insulator 21, a heating element 22, or the like.

The heat insulator 21 has a cylindrical shape and is formed mainly of silica and alumina. The shape and the material of the heat insulator 21 are not limited thereto.

The heating element 22 is a linear shape and is provided in a spiral shape or a meandering shape on an inner wall of the heat insulator 21. The heating element 22 generates heat according to the magnitude of power (hereinafter, also referred to as "heater output") supplied from a power source (not illustrated). The heating element 22 is preferably divided into multiple zones, each zone corresponding to a discharge hole 32 described below, for example, in the height direction of the process chamber 10. This enables temperature to be independently controlled for each zone.

Further, the heating unit 20 preferably has a metal outer cover, such as stainless steel, that covers an outer periphery of the heat insulator 21. Accordingly, the heat insulator 21 can be reinforced to maintain the shape of the heat insulator 21. Further, the heating unit 20 preferably further includes a water-cooling jacket that covers the outer periphery of the outer cover. Accordingly, a heat influence on the exterior of the heat insulator 21 can be reduced.

The discharge unit 30 discharges cooling fluid into a space A between the process chamber 10 and the heating unit 20. The cooling fluid may be, for example, air. Multiple, for example, six discharge units 30 are provided at predetermined intervals along the longitudinal direction of the process chamber 10. The multiple discharge units 30 are preferably provided so as to each have a corresponding heating element 22 of the heating elements 22, for example, divided into multiple zones. Each discharge unit 30 includes a branch 31, a discharge hole 32, an opening adjustment valve 33, or the like.

Figure 4:
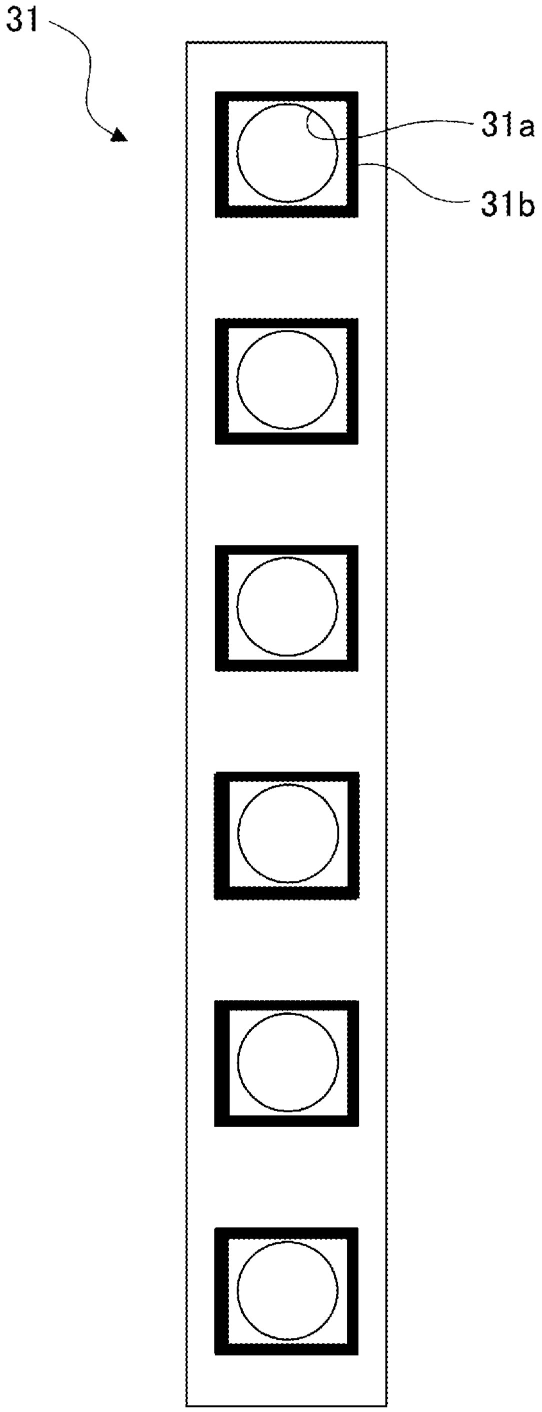
FIG. 4 is a diagram for explaining an inlet of a branch.

The branch 31 is a duct communicating with the fluid flowing path 40 described later. A seal member 31*b* formed of rubber or the like is provided around an inlet 31*a* of the branch 31 as illustrated in FIG. 4. FIG. 4 is a diagram illustrating the branch 31 viewed from a side on which the shutter mechanism 50 is provided.

The discharge hole 32 penetrates the heat insulator 21, and includes one end communicating with the branch 31 and the other end communicating with the space A. The discharge hole 32 discharges the cooling fluid direction toward the process chamber 10 in a substantially horizontal direction. A single discharge hole 32 is formed for a single branch 31. However, two or more discharge holes 32 may be formed for one branch 31.

The opening adjustment valve 33 is provided in the branch 31. The opening adjustment valve 33 is, for example, a butterfly valve which controls the flow rate of the cooling fluid flowing in the branch 31 by changing the angle of the valve relative to the flow direction of the cooling fluid in the branch 31. The opening adjustment valve 33 may be, for example, a manual type having a lever or a handle for rotating the valve. However, the opening adjustment valve 33 may be an automatic type in which the valve rotates in accordance with a command from the controller 80.

The fluid flowing path 40 supplies the cooling fluid to the multiple discharge units 30. In the fluid flowing path 40, the upstream side communicates with the heat exhaust unit 60, and the downstream side communicates with the multiple discharge units 30. The fluid flowing path 40 is provided with an opening/closing valve 41, a heat exchanger 42, a blower 43, and a buffer space 44 in this order from the upstream side.

The opening/closing valve 41 opens/closes the fluid flowing path 40. The heat exchanger 42 cools the cooling fluid discharged by the heat exhaust unit 60. The blower 43 sends the cooling fluid cooled by the heat exchanger 42 to the buffer space 44. The buffer space 44 communicates with the multiple discharge units 30 and diverts the cooling fluid sent by the blower 43 to the multiple discharge units 30.

The shutter mechanism 50 includes a main shutter 51, a connector 52, a main driving unit 53, a top shutter 54, a support portion 55, a top driving unit 56, or the like.

Figure 5:
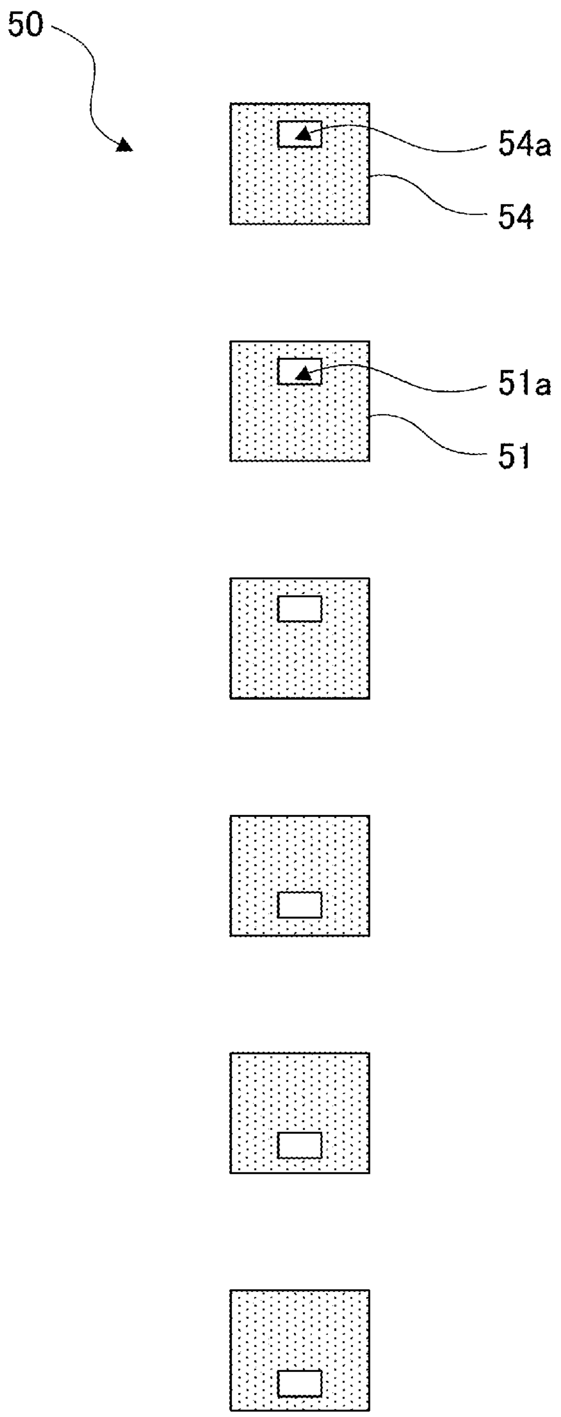
FIG. 5 is a diagram illustrating a shutter mechanism.

The main shutters 51 are provided to include multiple shutters, for example, five, at predetermined intervals along the height direction of the buffer space 44. Each main shutter 51 is provided so as to have a corresponding branch 31 of the multiple branches 31 except for the top branch 31. Each main shutter 51 is formed of a plate-shaped member having a size that can cover the inlet 31*a* of the branch 31. As illustrated in FIG. 5, each main shutter 51 includes a rectangular slit 51*a*. However, the shape of the slit 51*a* is not limited thereto, and may be circular, oval, or the like. FIG. 5 is a view when the shutter mechanism 50 is viewed from the side of the discharge unit 30.

The connector 52 connects the multiple main shutters 51 and the main driving unit 53, and transmits power of the main driving unit 53 to the main shutters 51.

Figure 2:
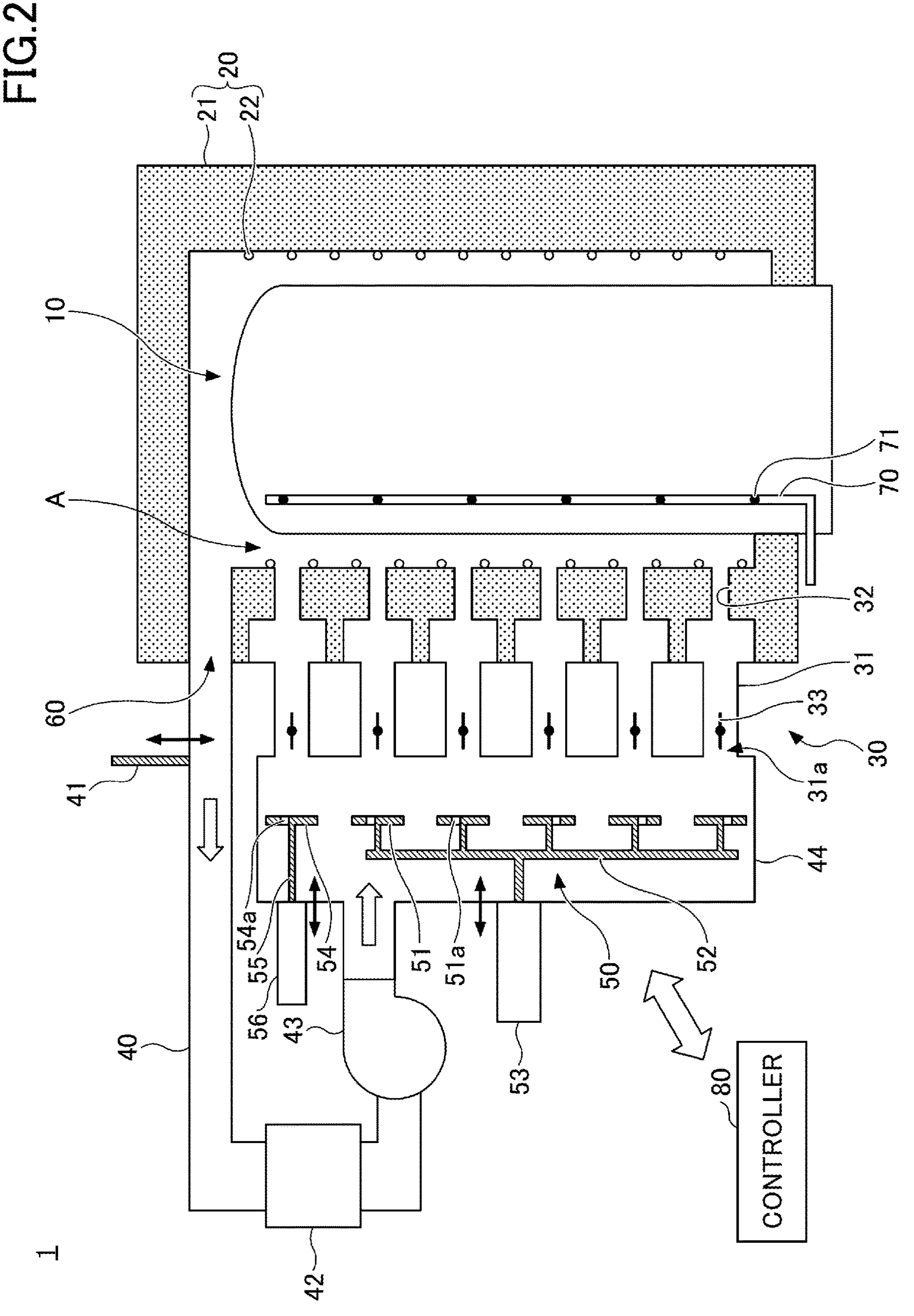
FIG. 2 is a schematic diagram (2) illustrating an example of a configuration of the heat treatment apparatus according to the first embodiment.
Figure 3:
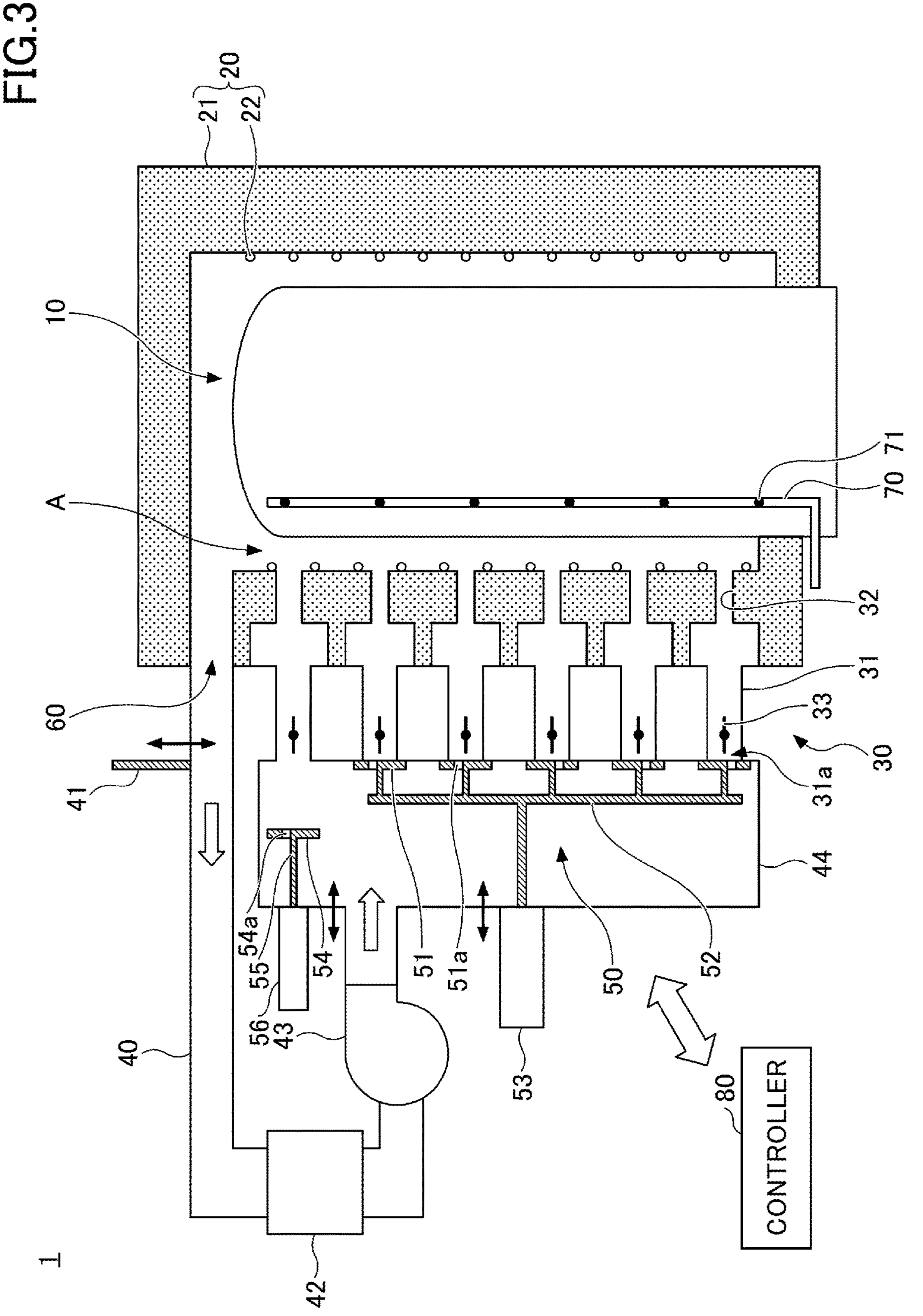
FIG. 3 is a schematic diagram (3) illustrating an example of a configuration of the heat treatment apparatus according to the first embodiment.
Figure 6:
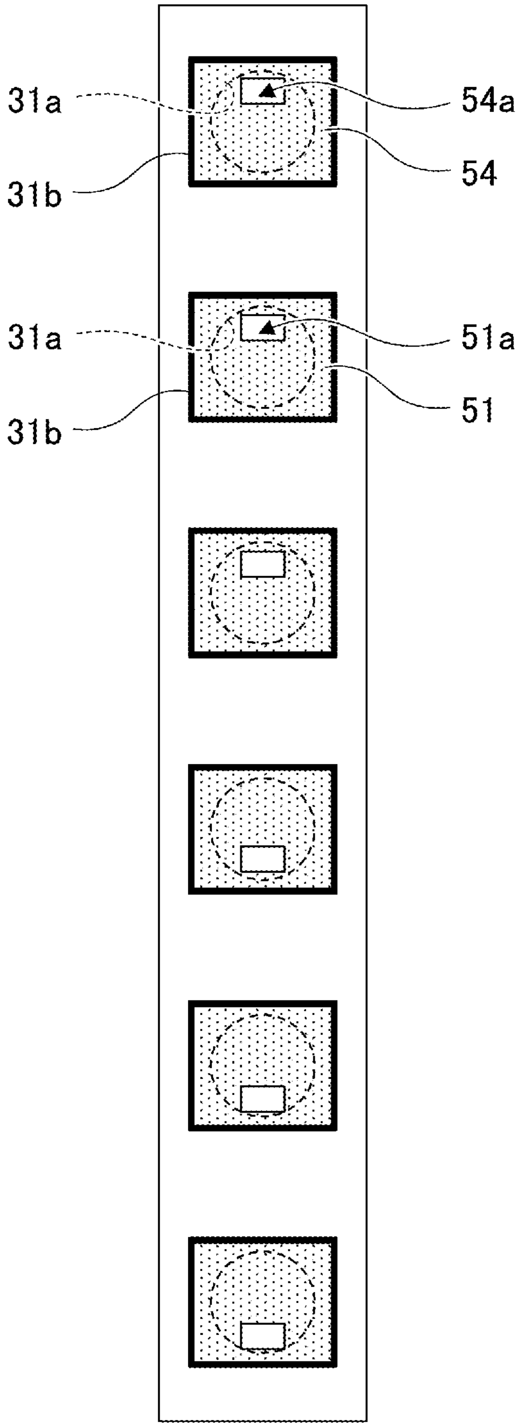
FIG. 6 is a diagram for explaining a state where the inlet of the branch is covered with a shutter.

The main driving unit 53 is connected to the multiple main shutters 51 via the connector 52. The main driving unit 53 is an actuator such as an air cylinder and moves the connector 52 to move the main shutter 51 between a closed position covering the inlet 31*a* of the multiple branches 31 and an open position spaced apart from the inlet 31*a* of the multiple branches 31. FIG. 1 and FIG. 3 illustrate that the main shutters 51 have moved to the closed position, and FIG. 2 illustrates that the main shutters 51 have moved to the open position. In the closed position, as illustrated in FIG. 6, the outer periphery of each main shutter 51 is in close contact with each seal member 31*b*, and the slit 51*a* is overlapped with the inlet 31*a* of the branch 31. Therefore, the cooling fluid flows into the branch 31 through the slit 51*a*. FIG. 6 is a diagram when the main shutters 51 are viewed from the side of the main driving unit 53 and the top driving unit 56.

The top shutter 54 is provided in the buffer space 44 corresponding to the top branch 31. The top shutter 54 opens/closes independently of the main shutters 51. The top shutter 54 is formed of a plate-shaped member having a size that can cover the inlet 31*a* of the top branch 31. As illustrated in FIG. 5, the top shutter 54 includes a rectangular slit 54*a*. However, the shape of the slit 54*a* is not limited thereto, and may be circular, oval, or the like.

The support portion 55 connects the top shutter 54 and the top driving unit 56, and transmits power of the top driving unit 56 to the top shutter 54.

The top driving unit 56 is connected to the top shutter 54 via a support portion 55. The top driving unit 53 is an actuator such as an air cylinder and moves the support portion 55 to move the top shutter 54 between a closed position covering the inlet 31*a* of the top branch 31 and an open position spaced apart from the inlet 31*a* of the top branch 31. FIG. 1 illustrates that the top shutter 54 has moved to the closed position, and FIG. 2 and FIG. 3 illustrate that the top shutter 54 has moved to the open position. In the closed position, as illustrated in FIG. 6, the outer periphery of the top shutter 54 is in close contact with the seal member 31*b*, and the slit 54*a* is overlapped with the inlet 31*a* of the branch 31. Therefore, the cooling fluid flows into the branch 31 through the slit 54*a*.

The heat exhaust unit 60 is an exhaust port which includes one end communicating with the space A above the top discharge hole 32 and the other end communicating with the fluid flowing path 40. The heat exhaust unit 60 discharges the cooling fluid recovered in the space A to the outside of the heat treatment apparatus 1. The cooling fluid discharged to the outside of the heat treatment apparatus 1 is cooled by the heat exchanger 42 provided in the fluid flowing path 40 and is supplied again from the discharge unit 30 to the space A. However, the cooling fluid discharged to the outside of the heat treatment apparatus 1 may be discharged without being reused.

The temperature detector 70 detects a temperature in the process chamber 10. The temperature detector 70 is, for example, a thermocouple, and multiple thermocouple temperature detectors 71 are provided so as to have a corresponding heating element 22 of the heating elements 22 divided into multiple zones. However, the temperature detector 70 may be provided in the space A outside the process chamber 10 to detect the temperature of the space A.

The controller 80 may be, for example, a computer. The controller 80 controls an operation of each component of the heat treatment apparatus 1. A program of a computer which performs the operation of each component of the heat treatment apparatus 1 is stored in a storage medium. The storage medium may be, for example, a flexible disk, a compact disk, a hard disk, a flash memory, a DVD, or the like.

For example, the controller 80 switches the control mode to one of a small flow rate mode, a large flow rate mode, and a top portion large flow rate mode, depending on a condition of the heat treatment performed in the heat treatment apparatus 1.

As illustrated in FIG. 1, the small flow rate mode is a mode for controlling the heating unit 20 based on the temperature detected by the temperature detector 70, in a state where the main shutters 51 and the top shutter 54 are moved to the closed position. In the small flow rate mode, since the main shutters 51 and the top shutter 54 cover the inlets 31*a*, a small flow rate of the cooling fluid passing through the slits 51*a* and 54*a* flows into the branch 31. Therefore, a small flow rate of the cooling fluid is supplied to space A.

As illustrated in FIG. 2, the large flow rate mode is a mode for controlling the heating unit 20 based on the temperature detected by the temperature detector 70, in a state where the main shutters 51 and the top shutter 54 are moved to the open position. In the large flow rate mode, since the main shutters 51 and the top shutter 54 are spaced apart from the inlets 31*a*, a large flow rate of the cooling fluid passing through the inlet 31*a* flows into the branch 31. Therefore, a large flow rate of the cooling fluid is supplied to space A.

As illustrated in FIG. 3, the top portion large flow rate mode is a mode for controlling the heating unit 20 based on the temperature detected by the temperature detector 70, in a state where the main shutters 51 are moved to the closed position and the top shutter 54 is moved to the open position. In the top portion large flow rate mode, since the main shutters 51 cover the inlets 31*a*, a small flow rate of the cooling fluid passing through the slit 51*a* flows into the branch 31 except the top branch 31, and a large flow rate of the cooling fluid flows into the top branch 31 because the top shutter 54 is spaced apart from the inlet 31*a*. Therefore, the top portion of the space A is more easily cooled than the middle and lower portions of the space A.

(Heat Treatment Method)

An example of a heat treatment method according to the first embodiment will be described with reference to FIG. 7. The heat treatment method according to the first embodiment is executed, for example, by controlling the operation of each component of the heat treatment apparatus 1 by the controller 80.

Figure 7:
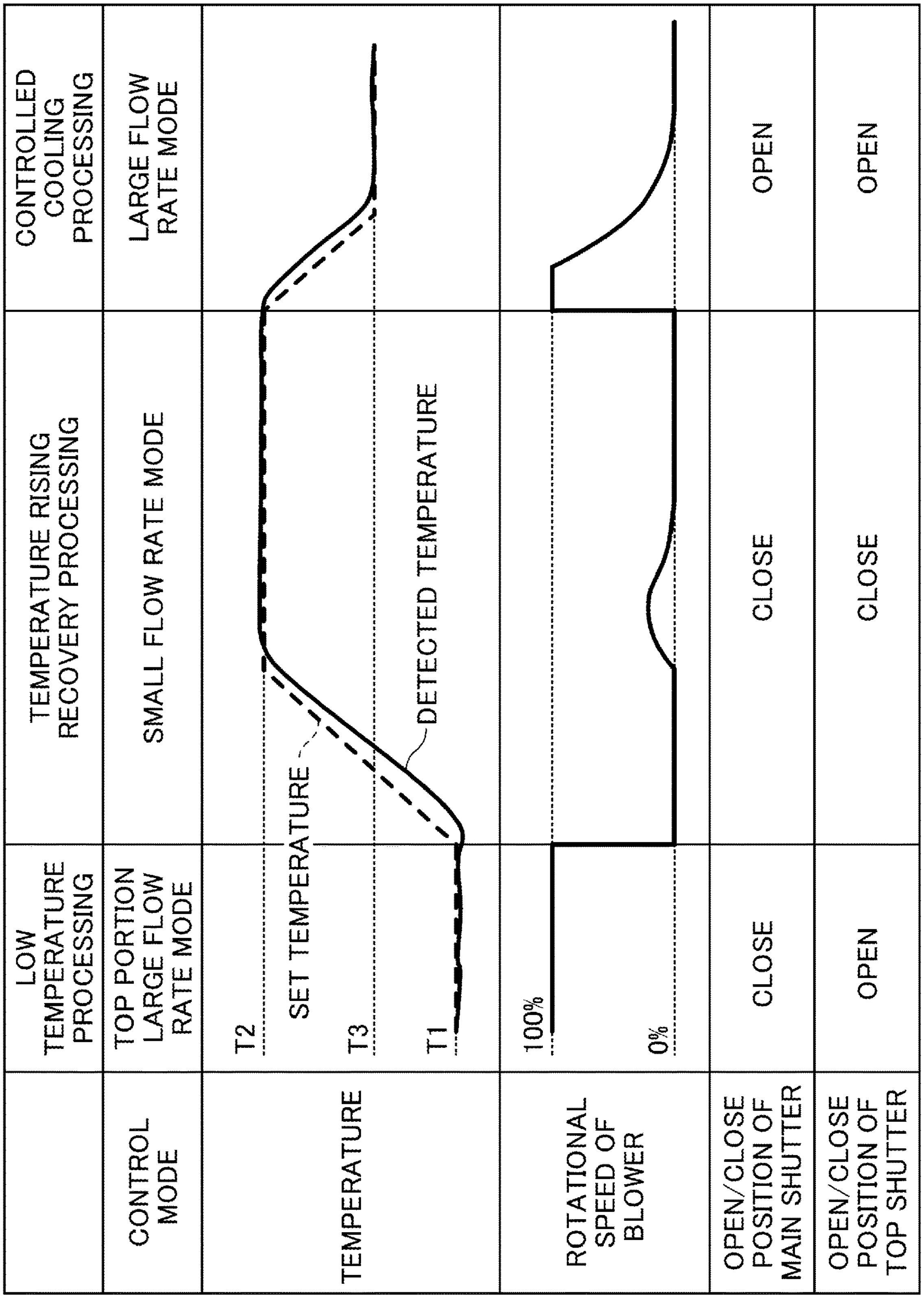
FIG. 7 is a diagram illustrating an example of operations of the heat treatment apparatus according to the first embodiment.

As illustrated in FIG. 7, the heat treatment method includes performing a low temperature processing, a temperature rising recovery processing, and a controlled cooling processing in this order.

The low temperature processing includes treating a substrate contained in the process chamber 10 while keeping the inside of the process chamber 10 at a low temperature. In the low temperature processing, the controller 80 sets the control mode to the top portion large flow rate mode. In other words, in a state where the positions of the main shutters 51 are set to the closed position and the position of the top shutter 54 is set to the open position, the controller 80 controls the heating unit 20 to cause the temperature detected by the temperature detector 70 to be a first temperature T1. Accordingly, a small flow rate of the cooling fluid passing through the slit 51*a* flows into the branches 31 except the top branch 31, and a large flow rate of the cooling fluid flows into the top branch 31. Therefore, the top portion of the space A is more easily cooled than the middle and lower portions of the space A. Further, the controller 80 sets, for example, the rotational speed of the blower 43 to 100%. The first temperature T1 may be a low temperature of, for example, 30° C. to 100° C.

The temperature rising recovery processing includes changing the temperature inside of the process chamber 10 from low to high and stabilizing the temperature in the process chamber 10 to a high temperature. In the temperature rising recovery processing, the controller 80 switches the control mode from the top portion large flow rate mode to the lower flow rate mode. In other words, in a state where the main shutters 51 and the top shutter 54 are moved to the closed position, the controller 80 performs ramping control on the heating unit 20 to cause the temperature detected by the temperature detector 70 to rise from the first temperature T1 to a second temperature T2. Further, the controller 80 sets, for example, the rotational speed of the blower 43 to 0%. Further, the controller 80 preferably sets the blower 43 in the range of a few % to several tens %, for example, for a predetermined period of time after the temperature detected by the temperature detector 70 reaches the second temperature T2. This enables a small flow rate of the cooling fluid to be supplied to the process chamber 10 to prevent overshoot. Note that the second temperature T2 is higher than the first temperature T1, and may be, for example, a high temperature of 600° C. to 1000° C.

The controlled cooling processing includes changing the temperature inside of the process chamber 10 from high to a predetermined temperature lower than the high temperature and stabilizing the temperature in the process chamber 10 to the predetermined temperature. In the controlled cooling processing, the controller 80 switches the control mode from the small flow rate mode to the large flow rate mode. In other words, in a state where the main shutters 51 and the top shutter 54 are moved to the open position, the controller 80 performs ramping control on the heating unit 20 to cause the temperature detected by the temperature detector 70 to drop from the second temperature T2 to a third temperature T3. Further, the controller 80 sets, for example, the rotational speed of the blower 43 to 100%. Further, the controller 80 preferably gradually decreases the rotational speed of the blower 43 from 100% to 0% after the temperature detected by the temperature detector 70 approaches the third temperature T3. As a result, the flow rate of the cooling fluid supplied to the process chamber 10 gradually decreases, so that overshoot can be prevented. Note that the third temperature T3 is higher than the first temperature T1 and lower than the second temperature T2, and may be, for example, 100° C. to 600° C.

If all shutters have a shutter mechanism that opens/closes simultaneously, in the low temperature process, the temperature control is performed while recovering heat by the cooling fluid to be supplied to the space A in a state where the control mode is set to the large flow rate mode. In this case, since the heat exhaust unit 60 is disposed above the top discharge hole 32, the heat recovery direction is from the lower portion to the upper portion of the space A. Therefore, the temperature of the top portion of the space A is likely to be higher temperature than the middle and lower portions of the space A. Therefore, the controller 80 controls such that the heater output with respect to the top heating element 22 is smaller than the heater output with respect to the other heating elements 22. However, in the low temperature control, the heater output with respect to the top heating element 22 becomes 0% so that the temperature at the upper portion of the space A may not be able to be controlled to the set temperature.

In contrast, the heat treatment apparatus 1 according to the first embodiment includes a shutter mechanism 50 including the top shutter 54 that opens/closes independently from the main shutter 51. Accordingly, in the low temperature processing, by opening the top shutter 54 in a state where the main shutters 51 are closed, a supply amount of the cooling fluid to the middle and lower portions of the space A can be reduced, and the supply amount of the cooling fluid to the upper portion of the space A can be increased. Therefore, the upper portion of the space A can be efficiently cooled with respect to the middle and lower portions of the space A, and the heater output with respect to the top heating element 22 can be prevented from being 0%. As a result, temperature control at low temperatures is improved.

Second Embodiment (Heat Treatment Apparatus)

Figure 8:
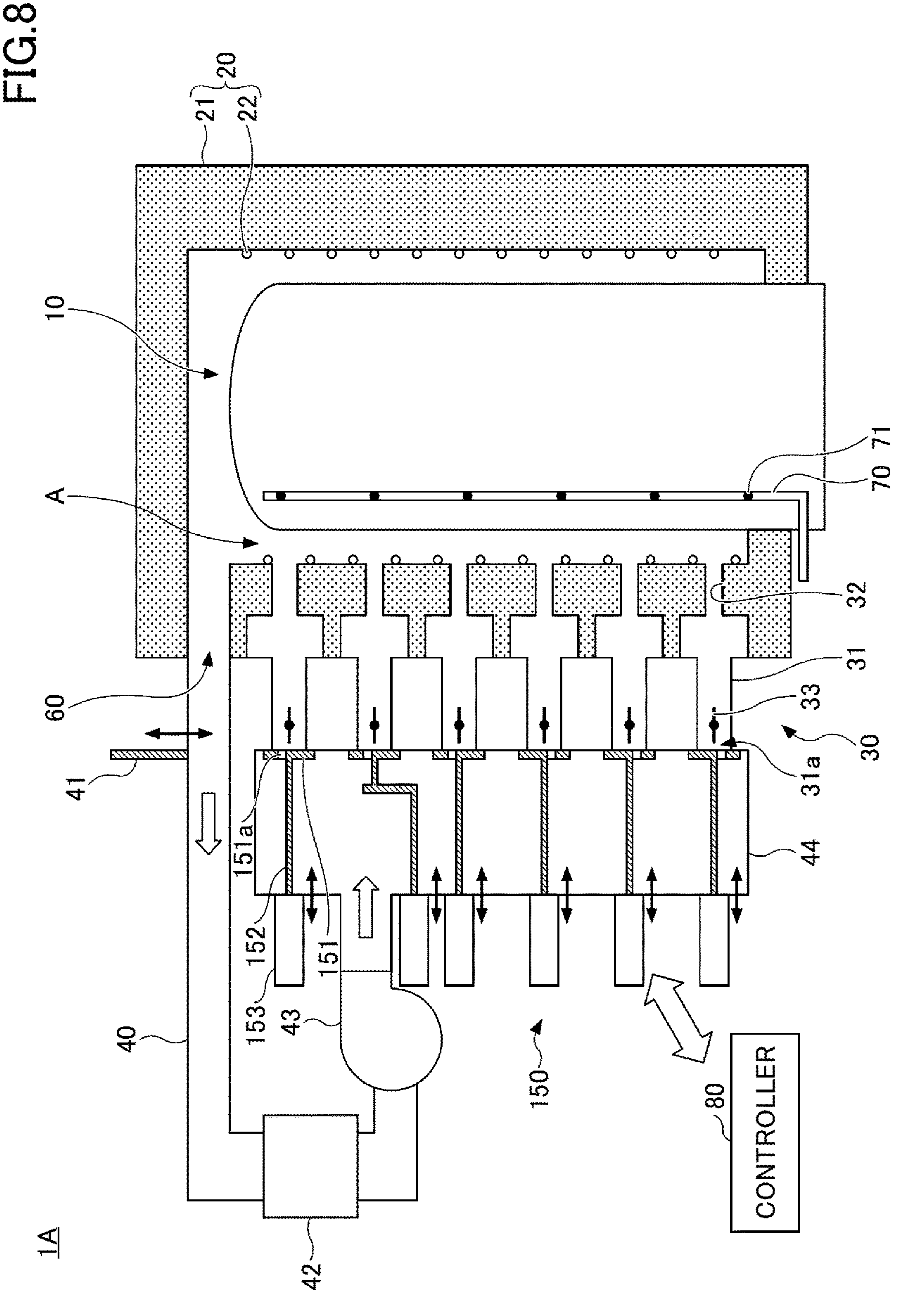
FIG. 8 is a schematic diagram (1) illustrating an example of a configuration of a heat treatment apparatus according to a second embodiment.
Figure 9:
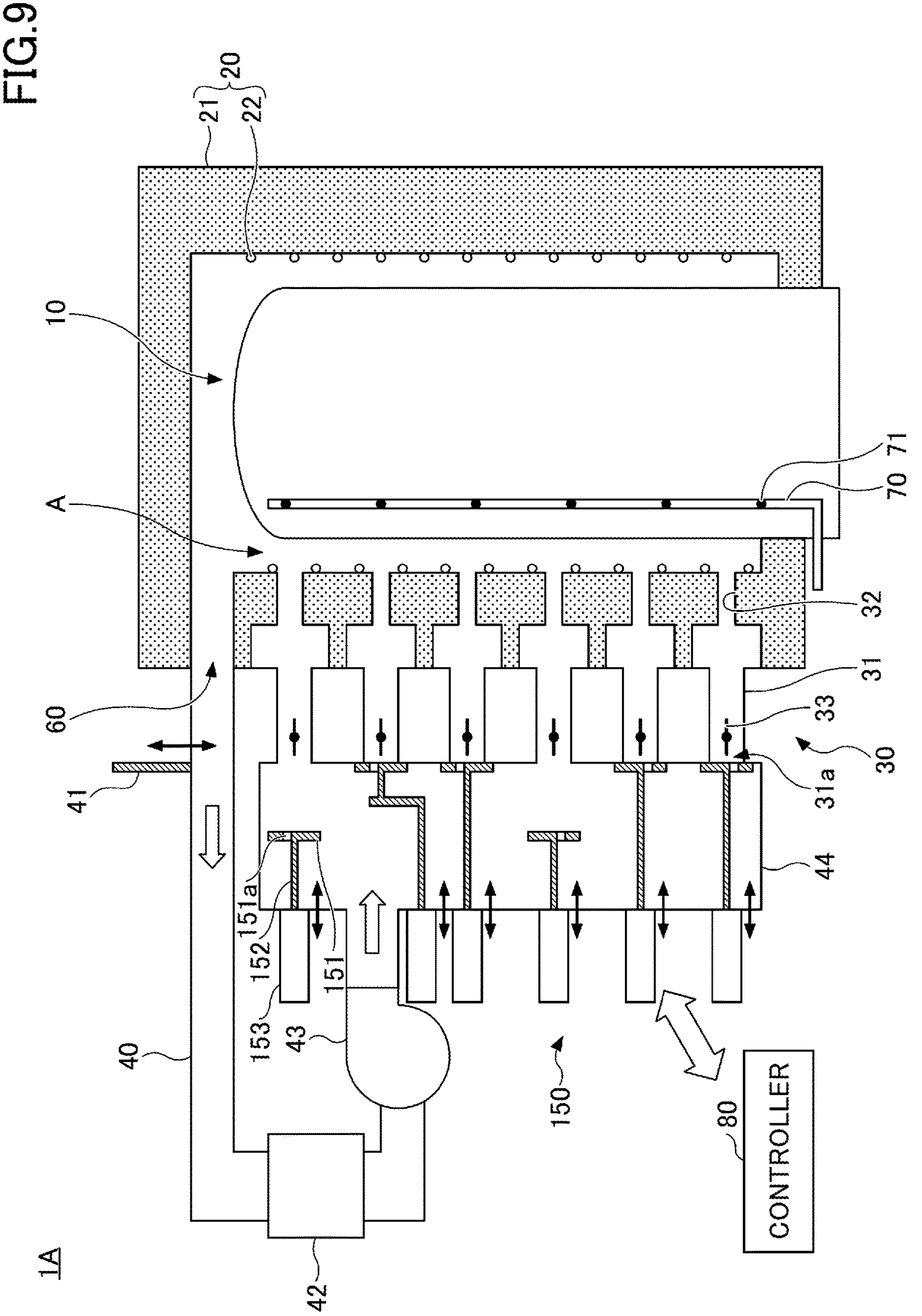
FIG. 9 is a schematic diagram (2) illustrating an example of a configuration of the heat treatment apparatus according to the second embodiment.

A configuration example of a heat treatment apparatus according to a second embodiment will be described with reference to FIG. 8 and FIG. 9.

A heat treatment apparatus 1A according to the second embodiment differs from the heat treatment apparatus 1 according to the first embodiment in that the heat treatment apparatus 1A according to the second embodiment includes a shutter mechanism 150 including multiple shutters 151 each independently opened/closed. The other configurations may be similar to those of the heat treatment apparatus 1 according to the first embodiment. Hereinafter, differences from the heat treatment apparatus 1 according to the first embodiment will be mainly described.

The shutter mechanism 150 includes a shutter 151, a support portion 152, a driving unit 153, or the like.

The shutter 151 is provided to include multiple shutters, for example, six, at predetermined intervals along the height direction of the buffer space 44. Each shutter 151 is provided so as to have a corresponding branch 31 of the multiple branches 31. Each shutter 151 is formed of a plate-shaped member having a size that can cover an inlet 31*a* of the branch 31. Each shutter 151 includes a rectangular slit 151*a*.

The support portion 152 connects the shutter 151 and the driving unit 153, and transmits power of the driving unit 153 to the shutter 151.

The driving unit 153 is connected to the shutter 151 via the support portion 152. The driving unit 153 is an actuator such as an air cylinder and moves the support portion 152 to move the shutter 151 between a closed position covering the inlet 31*a* of the branch 31 and an open position spaced apart from the inlet 31*a* of the branch 31. FIG. 8 illustrates that all shutters 151 have moved to the closed position. FIG. 9 illustrates that the first and fourth shutters 151 from the top have moved to the open position, and the second, third, fifth and sixth shutters 151 from the top have moved to the closed position. In the closed position, the outer periphery of each shutter 151 is in close contact with a corresponding seal member 31*b*, and the slit 151*a* is overlapped with the inlet 31*a* of the branch 31. Therefore, the cooling fluid flows into the branch 31 through the slit 151*a*.

(Heat Treatment Method)

An example of a heat treatment method according to the second embodiment will be described. The heat treatment method according to the second embodiment is executed, for example, by controlling the operation of each component of the heat treatment apparatus 1A by a controller 80.

The heat treatment method of the second embodiment, similar to the heat treatment method of the first embodiment, includes performing the low temperature processing, the temperature rising recovery processing, and the controlled cooling processing in this order.

In the low temperature processing, the controller 80 sets the control mode to the top portion large flow rate mode. In the temperature rising recovery processing, the controller 80 sets the control mode to the small flow rate mode. In the controlled cooling processing, the controller 80 sets the control mode to the large flow rate mode.

The top portion large flow rate mode is a mode for controlling the heating unit 20 based on the temperature detected by the temperature detector 70 in a state where the shutters 151 except for the top shutter 151 are moved to the closed position and the top shutter 151 is moved to the open position.

The small flow rate mode is a mode for controlling the heating unit 20 based on the temperature detected by the temperature detector 70, in a state where all shutters 51 are moved to the closed position.

The large flow rate mode is a mode for controlling the heating unit 20 based on the temperature detected by the temperature detector 70, in a state where all shutters 151 are moved to the open position.

The heat treatment apparatus 1A according to the second embodiment includes a shutter mechanism 50 in which each shutter 151 opens/closes independently from the others. Accordingly, in the low temperature processing, by opening the top shutter 151 in a state where the shutters 151 except for the top shutter 151 are closed, a supply amount of the cooling fluid to the middle and lower portions of the space A can be reduced, and the supply amount of the cooling fluid to the upper portion of the space A can be increased. Therefore, the upper portion of the space A can be efficiently cooled with respect to the middle and lower portions of the space A, and the heater output with respect to the top heating element 22 can be prevented from being 0%. As a result, temperature control at low temperatures is improved.

EXAMPLES

In the heat treatment apparatus 1 described above, examples in which the temperature control performance when the low temperature processing is performed is evaluated will be described. Hereinafter, in the heat treatment apparatus 1, each of the height areas corresponding to the first, second, third, fourth, fifth, and sixth discharge holes 32 from the bottom are referred to as a bottom area, a first center area, a second center area, a third center area, a fourth center area, and a top area.

In Example 1, the time change of the temperature and the heater output is evaluated when the heating unit 20 is controlled based on the temperature detected by the temperature detector 70 in a state where the rotational speed of the blower 43 is set to 100%, the main shutters 51 are closed, and the top shutter 54 is opened. In Example 1, the controlled temperature of all areas is initially set at 55° C., after four minutes, only the controlled temperature of the top area is changed from 55° C. to 54° C., and then after 19 minutes, the control temperature of the top area is changed from 54° C. to 53.5° C.

In Comparative Example 1, the time change of the temperature and the heater output is evaluated when the heating unit 20 is controlled based on the temperature detected by the temperature detector 70 in a state where the rotational speed of the blower 43 is set to 100% and the main shutters 51 and the top shutter 54 are opened. In Comparative Example 1, the controlled temperature in all areas is initially set at 55° C., and after five minutes, the control temperature in the top area is changed from 55° C. to 54° C.

Figure 10A:
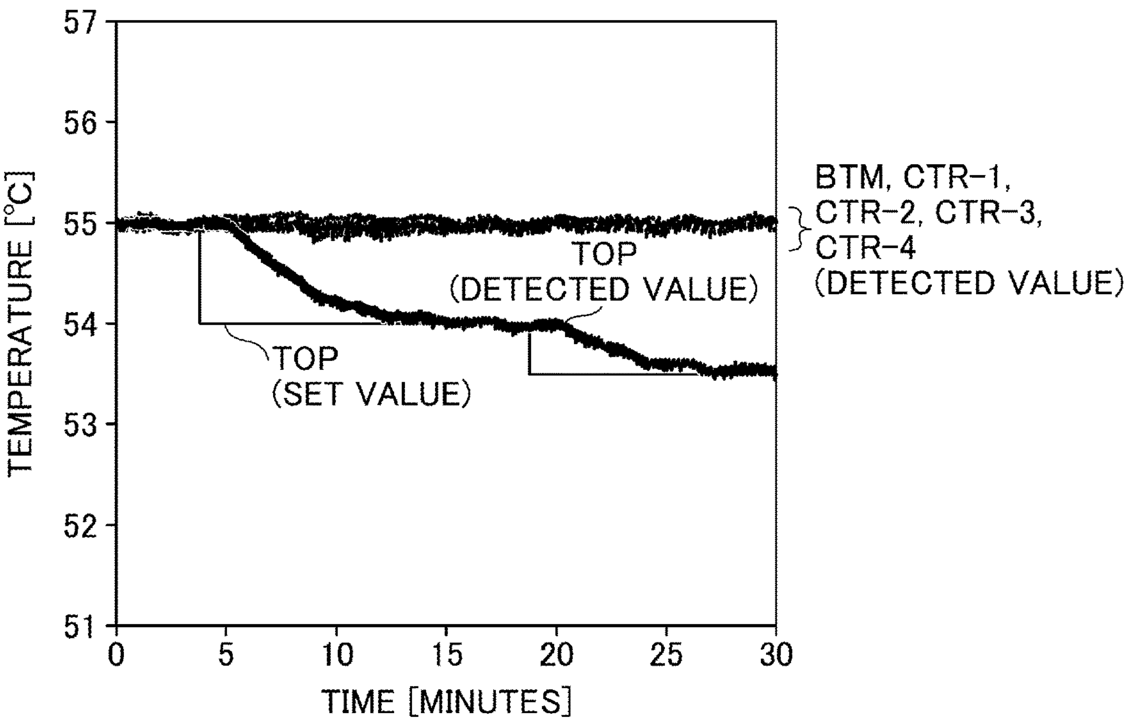
FIG. 10A and FIG. 10B are diagrams illustrating a temperature characteristic and a heater output characteristic of Example 1.
Figure 10B:
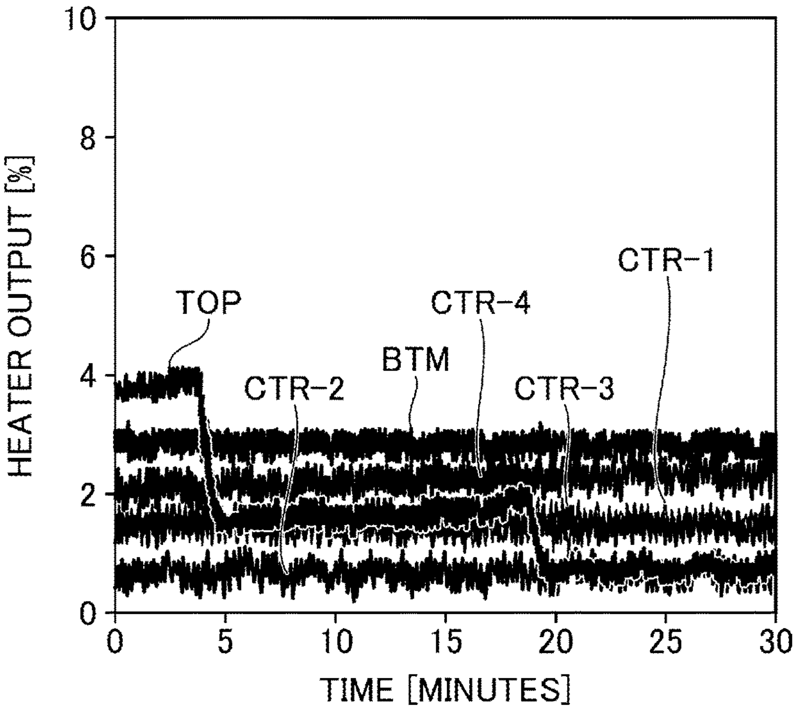

FIG. 10A and FIG. 10B are diagrams illustrating a temperature characteristic and a heater output characteristic of Example 1. FIG. 10A illustrates the time change of the controlled temperature and the detected temperature, and FIG. 10B illustrates the time change of the heater output. In FIG. 10A, time [minutes] is illustrated on the horizontal axis, temperature [° C.] is illustrated on the vertical axis, a controlled temperature is illustrated by a narrow line, and a detected temperature is illustrated by a thick line. In FIG. 10B, time [minutes] is illustrated on the horizontal axis, and a heater output [%] is illustrated on the vertical axis.

Figure 11A:
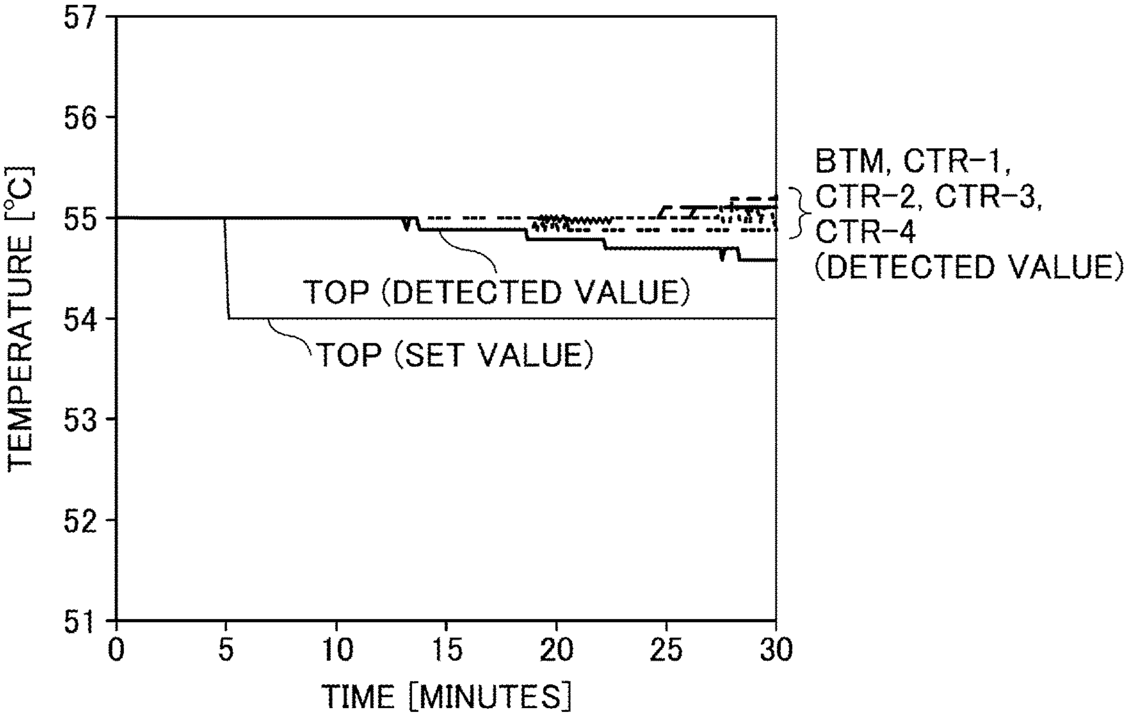
FIG. 11A and FIG. 11B are diagrams illustrating a temperature characteristic and a heater output characteristic of Comparative Example 1.
Figure 11B:
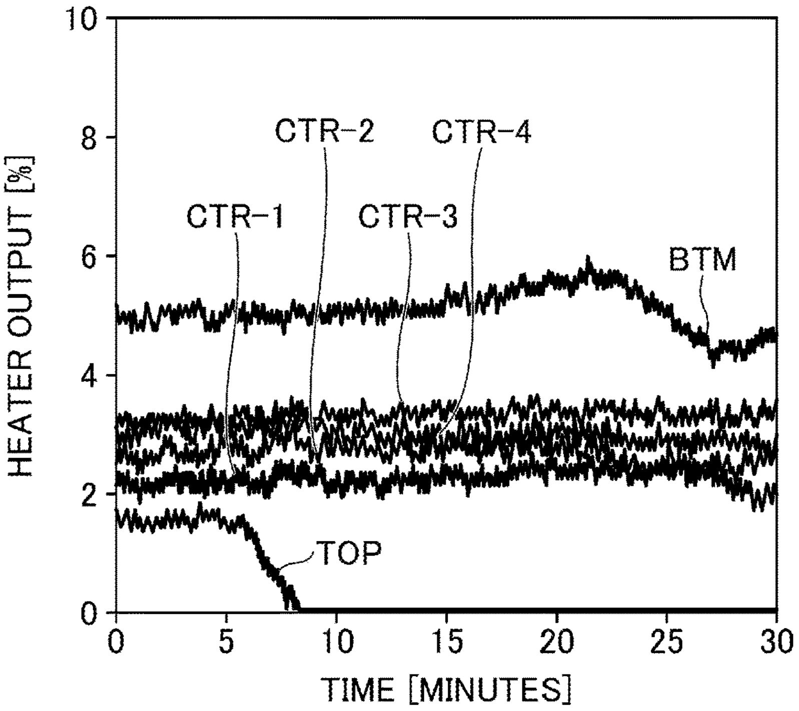

FIG. 11A and FIG. 11B are diagrams illustrating a temperature characteristic and a heater output characteristic of Comparative Example 1. FIG. 11A illustrates the time change of the controlled temperature and the detected temperature, and FIG. 11B illustrates the time change of the heater output. In FIG. 11A, time [minutes] is illustrated on the horizontal axis, temperature [° C.] is illustrated on the vertical axis, a controlled temperature is illustrated by a narrow line, and the detected temperature is illustrated by a thick line. In FIG. 11B, time [minutes] is illustrated on the horizontal axis, and a heater output [%] is illustrated on the vertical axis.

As illustrated in FIG. 10A, in Example 1, the detected temperature in the area where the controlled temperature is fixed at 55° C. (BTM, CTR-1 to CTR-4) is substantially the same as the controlled temperature. Further, in Example 1, the detected temperature in the area (TOP) where the controlled temperature is changed from 55° C. to 54° C. and 53.5° C. becomes substantially the same as the controlled temperature approximately 10 minutes after the controlled temperature has changed. From the results of Example 1, it is shown that the high temperature controllability is obtained by controlling the heating unit 20 based on the temperature detected by the temperature detector 70 in a state where the rotational speed of the blower 43 is set to 100%, the main shutter 51 is closed, and the top shutter 54 is opened. This is because, as illustrated in FIG. 10B, in Example 1, the heater output is not 0% in both the area where the controlled temperature is fixed at 55° C. and the area where the controlled temperature is changed partway, and the control by the heating unit 20 is performed.

On the other hand, as illustrated in FIG. 11A, in Comparative Example 1, the detected temperature in the area where the controlled temperature is fixed at 55° C. (BTM, CTR-1 to CTR-4) is substantially the same as the controlled temperature. However, in Comparative Example 1, the detected temperature in the area (TOP) where the controlled temperature is changed from 55° C. to 54° C. partway does not reach the controlled temperature even when 25 minutes have elapsed after the controlled temperature has changed from 55° C. to 54° C. From the results of Comparative Example 1, it is shown that the high temperature controllability is not obtained when the heating unit 20 is controlled based on the temperature detected by the temperature detector 70 in a state where the rotational speed of the blower 43 is set to 100%, and the main shutter 51 and the top shutter 54 are opened. This is because, as illustrated in FIG. 11B, in Example 1, the heater output becomes 0% in the top area where the controlled temperature is changed 55° C. to 54° C. partway, and the control by the heating unit 20 is not performed.

From the above results, it may be considered that the temperature control in the low temperature is improved by controlling the heating unit 20 based on the temperature detected by the temperature detector 70 in a state where the rotational speed of the blower 43 is set to 100%, the main shutter 51 is closed, and the top shutter 54 is opened.

The embodiments disclosed herein should be considered to be exemplary in all respects and not restrictive. The above embodiments may be omitted in various aspects, substituted, or modified in various forms without departing from the appended claims and spirit thereof.

What is claimed is:

1. A heat treatment apparatus comprising:
a vertically long process chamber;
a heater configured to heat the process chamber; and
a cooler configured to cool the process chamber,
wherein the cooler includes:
- a plurality of discharge holes provided at intervals along a longitudinal direction of the process chamber to discharge cooling fluid toward the process chamber; and
- a plurality of shutters provided corresponding to the plurality of discharge holes, wherein at least one of the plurality of shutters is configured to move to an open position independently of other shutters, and
wherein at least a shutter at a top portion among the plurality of shutters is configured to move to the open position independently of other shutters.

2. The heat treatment apparatus according to claim 1, wherein the heater includes a plurality of heating elements provided at intervals along the longitudinal direction of the process chamber.

3. The heat treatment apparatus according to claim 2, wherein each of the plurality of shutters is provided so as to have a corresponding heating element of the plurality of heating elements.

4. The heat treatment apparatus according to claim 1, wherein each of the plurality of shutters includes a slit through which the cooling fluid passes.

5. The heat treatment apparatus according to claim 1, wherein each of the plurality of shutters is provided for a corresponding discharge hole of the plurality of discharge holes.

6. The heat treatment apparatus according to claim 1, wherein the cooler includes a plurality of opening adjustment valves, each of the opening adjustment valves being provided for a corresponding discharge hole of the plurality of discharge holes.

7. The heat treatment apparatus according to claim 1, wherein the cooler includes a blower configured to send the cooling fluid to each of the plurality of discharge holes.

8. The heat treatment apparatus according to claim 1, wherein the cooler includes a heat exhaust port configured to discharge the cooling fluid, discharged from the plurality of discharge holes, from above a discharge hole at a top portion.

9. The heat treatment apparatus according to claim 1, wherein the process chamber accommodates a plurality of substrates at intervals along a longitudinal direction.

10. A heat treatment apparatus comprising:

a vertically long process chamber;

a heater configured to heat the process chamber; and a cooler configured to cool the process chamber, wherein the cooler includes:

a plurality of discharge holes provided at intervals along a longitudinal direction of the process chamber to discharge cooling fluid toward the process chamber; and a plurality of shutters provided corresponding to the plurality of discharge holes, wherein at least one of the plurality of shutters is configured to move to an open position independently of other shutters, and wherein each of the plurality of shutters is configured to move to the open position independently of other shutters.

11. A heat treatment method of a heat treatment apparatus including: a heater configured to heat a vertically long process chamber; and a cooler configured to cool the process chamber, the cooler including a plurality of discharge holes provided at intervals along a longitudinal direction of the process chamber to discharge cooling fluid toward the process chamber; and a plurality of shutters provided corresponding to the plurality of discharge holes, the heat treatment method comprising:

performing a heat treatment in the process chamber in a state where at least one of the plurality of shutters is moved to an open position and a remainder of the plurality of shutters is moved to a closed position, wherein the performing of the heat treatment includes moving at least a shutter at a top portion among the plurality of shutters to the open position independently of other shutters.

12. A heat treatment method of a heat treatment apparatus including: a heater configured to heat a vertically long process chamber; and a cooler configured to cool the process chamber, the cooler including a plurality of discharge holes provided at intervals along a longitudinal direction of the process chamber to discharge cooling fluid toward the process chamber; and a plurality of shutters provided corresponding to the plurality of discharge holes, the heat treatment method comprising:

performing a heat treatment in the process chamber in a state where at least one of the plurality of shutters is moved to an open position and a remainder of the plurality of shutters is moved to a closed position, wherein the performing of the heat treatment includes moving each of the plurality of shutters to the open position independently of other shutters.

* * * * *